United States Patent [19]

Foss

[11] Patent Number: 6,112,006

[45] Date of Patent: Aug. 29, 2000

[54] SPLICE ARRANGEMENTS FOR OPTICAL FIBRE CABLES

[75] Inventor: Raymond Charles Foss, Plymouth, United Kingdom

[73] Assignee: Spirent PLC, West Sussex, United Kingdom

[21] Appl. No.: 09/077,211

[22] PCT Filed: Nov. 22, 1996

[86] PCT No.: PCT/GB96/02889

§ 371 Date: May 21, 1998

§ 102(e) Date: May 21, 1998

[87] PCT Pub. No.: WO97/19377

PCT Pub. Date: May 29, 1997

[30] Foreign Application Priority Data

Nov. 22, 1995 [GB] United Kingdom .................... 9523891
Feb. 8, 1996 [GB] United Kingdom .................... 9602573
May 1, 1996 [GB] United Kingdom .................... 9609028

[51] Int. Cl.[7] ...................................................... G02B 6/36
[52] U.S. Cl. ............................................................ 385/135
[58] Field of Search ..................................... 385/134–137

[56] References Cited

U.S. PATENT DOCUMENTS

| 4,770,357 | 9/1988 | Sander et al. . |
| 4,913,522 | 4/1990 | Nolf et al. . |
| 4,941,720 | 7/1990 | Barwig et al. . |
| 4,948,220 | 8/1990 | Violo et al. . |
| 5,187,766 | 2/1993 | Finzel et al. . |
| 5,420,956 | 5/1995 | Grugel et al. . |

FOREIGN PATENT DOCUMENTS

| 0370819 | 5/1990 | European Pat. Off. .......... G02B 6/36 |
| 0623832 | 3/1994 | European Pat. Off. .......... G02B 6/44 |
| 3743632 | 7/1989 | Germany .......................... G02B 6/36 |
| 4140701 | 12/1992 | Germany .......................... G02B 6/36 |
| 62-32404 | 12/1987 | Japan ...................................... 385/135 |
| 2165661 | 4/1986 | United Kingdom ............. G02B 6/36 |
| 2176024 | 12/1986 | United Kingdom ............. G02B 6/36 |
| 2274174 | 7/1994 | United Kingdom ............. G02B 6/36 |
| 2275786 | 9/1994 | United Kingdom ............. G02B 6/24 |
| 2286691 | 8/1995 | United Kingdom ............. G02B 6/36 |
| WO 94/00786 | 1/1994 | WIPO ............................... G02B 6/36 |
| WO 95/07486 | 3/1995 | WIPO ............................... G02B 6/44 |
| WO 95/10059 | 4/1995 | WIPO ............................... G02B 6/44 |
| WO 97/19377 | 5/1997 | WIPO ............................... G02B 6/44 |

*Primary Examiner*—John D. Lee
*Attorney, Agent, or Firm*—Tim Headley; Haynes and Boone, LLP

[57] ABSTRACT

A splice enclosure for optical fiber cables comprises a base (20) having at least one port (21) to receive a folded-over loop of a main optical fiber cable (10). The enclosure further comprises a plurality of storage trays (30) to receive loops or bights of individual fibers of the cable (10). The trays (30) are arranged to accommodate splices (33) between the fibers of the main cable (10), and the fibers of stop cables (18).

15 Claims, 10 Drawing Sheets

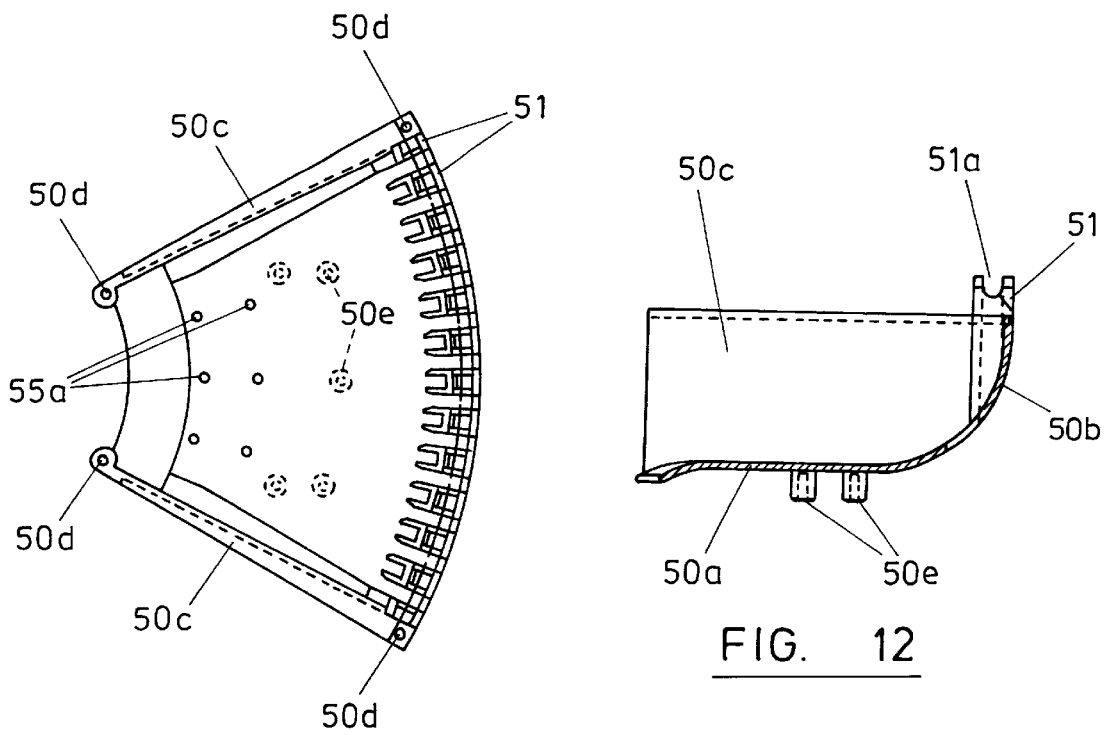
FIG. 11
FIG. 12
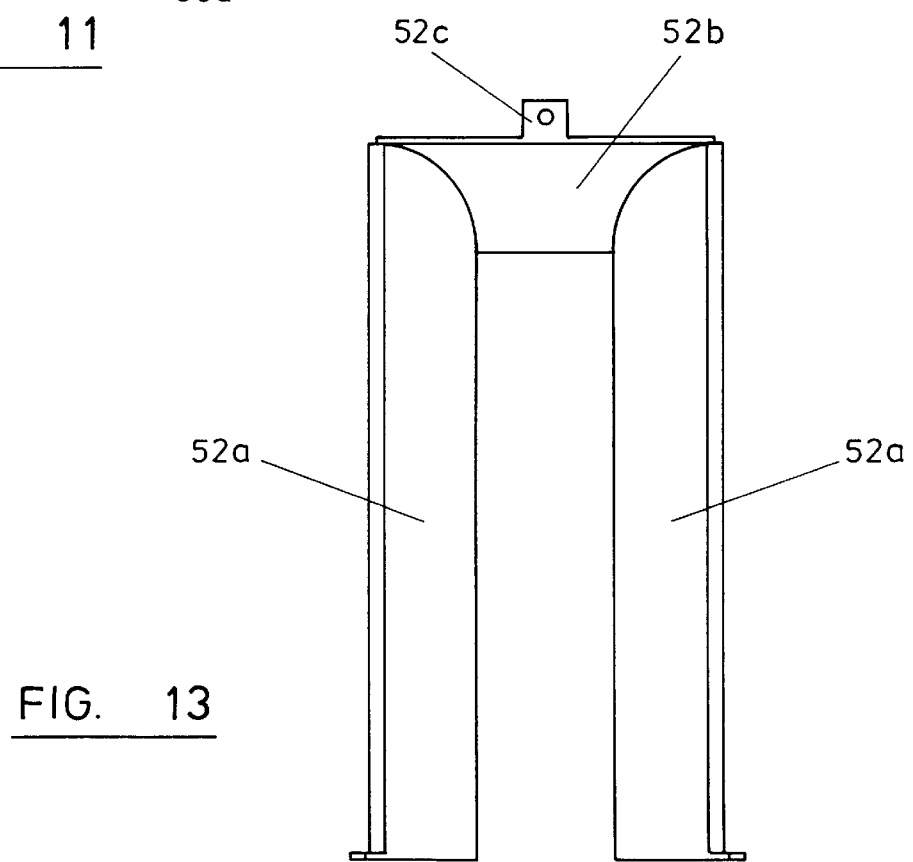
FIG. 13

SPLICE ARRANGEMENTS FOR OPTICAL FIBRE CABLES

BACKGROUND OF THE INVENTION

The present invention relates to arrangements for splicing optical fibre cables together and more particularly to splice enclosures for optical fibre cables.

DESCRIPTION OF THE PRIOR ART

Hitherto, it has been the usual practice for an optical fibre distribution network to consist of a branching arrangement, in which a cable runs from an exchange to a node at which it branches, each branch cable runs to another node at which it in turn branches, and so on. At each node, one or more incoming cables are connected via splitters to a plurality of outgoing cables. These branching network arrangements suffer a number of disadvantages, including the fact that they requires a large number of splitters, which are expensive, and the enclosures required at each node are complex: moreover, the procedures which have to be carried out when splicing cables together are complicated and time consuming, involving preparation of the cable ends, assembly of each cable to a manifold of the enclosure, insertion of each fibre through a feed tube, insertion of each fibre and its feed tube into a splice storage tray, and splicing the fibres together.

A more recently introduced distribution arrangement consists of a network of continuous rings of optical fibre cable, adjacent rings being interconnected. This arrangement provides the advantage that, in order to connect each customer to the network, only a short run of cable is needed from the ring to the customer's premises. Also, the network can be extended easily, to accommodate new customers, by adding additional rings. To-date, such ring network arrangements have used splice enclosures of the types previously designed and used for the above-described branching network.

SUMMARY OF THE INVENTION

We have now devised splicing arrangements which are particularly suited to use in ring networks, involving simplified and less time-consuming installation procedures.

In accordance with the present invention, there is provided a splice enclosure for optical fibre cables, comprising a base having at least one port to receive a folded-over loop or bight of a main optical fibre cable, and a plurality of trays or other storage supports to receive loops or bights of individual fibres of said cable, said storage supports also being arranged to accommodate splices between said fibres and the fibres of additional cables.

Preferably the enclosure is arranged for the additional cables, typically running to local customers, to enter and leave the enclosure through its base, preferably through one or more ports separate from the port for the loop or bight of the main cable.

In use of this enclosure, when a ring of the main distribution cable is being or has been laid, the enclosure may be installed at any desired point around the ring. In doing this, the main cable is folded, at the desired point, into a loop or bight, its outer layers being cut away over at least a central part of that bight to expose the individual fibres. The bight of cable is then positioned to extend through the enclosure base, and the loops or bights of the individual fibres are assembled to the trays or other individual storage supports. It will be appreciated that this procedure has not required any of the fibres to be cut or spliced and the ring has remained intact for all fibres of the main cable. The arrangement can be left in this condition until it is required to run additional cables from the enclosure to individual customers: at such time, a selected fibre of the main cable is cut, at a point within its respective tray, and its two cut ends are spliced to respective fibres of the additional cable, which is installed so as to run to an individual customer's premises at which the two fibres are connected together and also a coupling is made to the customer's equipment. The additional or "drop" cable therefore effectively completes the ring, between the cut ends of the fibre of the main cable.

It will accordingly be appreciated that, when laying a main cable, it is relatively straightforward to install enclosures of the present invention at intervals along its route, because no splicing is necessary (in contrast to hitherto known arrangements, which require substantial numbers of splices to be made even when simply laying the main cable).

Typically the main cable comprises a bundle of tubes, each containing a plurality of fibres. It will be appreciated that, in order to expose the individual fibres, firstly the sheath and other outer layers of the main cable are cut away over a predetermined length of the cable, then the individual fibre-containing tubes are cut away over a relatively shorter length. The enclosure of the present invention preferably includes means for retaining the cut end portions of the fibre-containing tubes of the main cable.

Preferably the trays or other storage supports are arranged generally face-to-face with each other in radial planes, around a longitudinal axis of the enclosure. In this case, preferably each tray or storage support tapers in thickness, towards the axis of the enclosure. Preferably each tray or storage support is arranged to accommodate its fibre splices adjacent its thicker, radially outer edge and may be arranged to accommodate additional fibre splices adjacent its thinner, radially inner edge.

Preferably, in order to gain access to the tray or storage support, each tray or support can be pivoted outwardly relative to a point adjacent its lower end. Additionally or instead, each tray or storage support may be detachable from its mount.

For example, the main cable may comprise 144 individual fibres, consisting of twelve fibres contained in each of twelve tubes or eight fibres contained in each of eighteen tubes. Preferably the enclosure of the present invention comprises 72 trays or storage supports, each for receiving two individual fibre bights: this enables the enclosure to accommodate a main cable having a total of 144 fibres. However, the enclosure may accommodate the loops or bights of several main cables each of fewer fibres, but having in total up to 144 fibres. Preferably each tray or support can accommodate a number of splices for each fibre of the main cable, enabling several additional fibres to be connected into each main fibre (each additional fibre running to a local customer and returning uninterrupted).

Also in accordance with the present invention, there is provided a method of installing a splice enclosure on a main optical fibre distribution cable, comprising removing the outer layer or layers of the main distribution cable to expose its individual optical fibres over a predetermined length thereof, folding the cable into a bight, positioning said bight to extend through a base of the splice enclosure, and engaging bights of individual fibres of the main distribution cable with respective trays or other storage supports of the enclosure.

In order to accommodate as many as 72 trays, known enclosure arrangements would occupy considerable space.

We have now devised a splice enclosure which can include a large number of trays but provide a compact arrangement.

Thus, further in accordance with the present invention, there is provided a splice enclosure for optical fibre cables, comprising a plurality of trays or other storage supports to receive coils of optical fibres and/or fibre splices, splitters or other components, said trays or other supports being arranged generally face-to-face with each other in radial planes, around a longitudinal axis of the enclosure.

Preferably each of the trays or other storage supports is pivotable radially outwards in order to gain access to it. The trays can thus be packed closely together, without the need to leave space for trays to be moved apart (circumferentially of the enclosure) to gain access to any individual tray. Preferably the pivot point is at or adjacent a lower end of each tray.

Preferably the trays or other storage supports of the enclosure are arranged as a plurality of modules, each comprising a plurality of the trays. For example, there may be six modules or groups each of twelve trays. Preferably the modules are individually removable from the enclosure. Accordingly, the enclosure can be provided with any required number of modules initially, and further modules added as and when needed.

Each of these modules preferably comprises a support member to which each of the associated trays are individually pivoted. Preferably the support member is itself pivotally mounted to a base member of the enclosure, so that the entire module of trays can be pivoted outwardly as a group. Preferably means are provided for retaining each module support member in its normal position. Preferably means are provided for retaining each tray in its normal position relative to its support member.

Preferably the enclosure includes an open space extending axially from its base member, in the centre of the assembly of trays: the loop or bight of the or each main cable is passed upwardly through this open space. Preferably the enclosure includes a storage support, above the assembly of trays, to support the loop of the or each main cable, optionally in several coils. Preferably this storage support comprises a funnel-shaped ring having an opening in its centre.

Preferably the support member of each module is arranged to accommodate fibre loops passing from the storage support to the individual trays. Preferably the support member is provided with means for holding the cut-back ends of the tubes which contain those fibres.

Preferably each tray includes an entry guide portion providing an open channel into which the fibres may be laid: a cover is also provided to close this channel once the fibres have been laid in it. Preferably corresponding studs project from the entry guide portion of the tray and from its cover, to provide a pivotal axis for the tray: preferably these studs engage within notches formed in an adjacent pair of upstanding projections on the support member of the respective module.

Thus, also in accordance with the present invention, there is provided an optical fibre storage tray having an entry guide portion defining an open channel into which fibres may be laid, and a cover for closing across said channel, said entry guide portion and said cover having oppositely-directed studs to provide for pivotal mounting of the tray.

It is important that the fibres do not become trapped under the cover as this is fitted to the entry guide portion.

Therefore, in accordance with the present invention, there is provided an optical fibre storage tray having an entry guide portion defining an open channel into which fibres may be laid, and a cover for closing across said channel, in which a boundary wall of said open channel comprises a series of upstanding teeth between which projecting teeth of said cover fit.

Typically an optical fibre splice enclosure is installed in a pit in the ground, with the enclosure being positioned generally horizontally. However, if the enclosure comprises a large number of trays, its weight is substantial and this makes it difficult to lift the enclosure out of the pit in order to carry out splicing or maintenance work.

Therefore also in accordance with the present invention, there is provided an arrangement for mounting a splice enclosure in a pit, said arrangement comprising a pivoted arm to which the splice enclosure may be mounted, enabling the enclosure to be pivoted from a horizontal position to an upright position, said arm also being telescopic so that the enclosure can be raised when in its upright position.

Further in accordance with the present invention, there is provided an arrangement for mounting a splice enclosure in a pit, said arrangement comprising a pivoted arm to which the splice enclosure may be mounted, enabling the enclosure to be pivoted from a horizontal position to an upright position, said arm including a joint enabling the enclosure to be tilted in any desired direction. This enables the operator to position the enclosure in an optimum manner for whichever tray he wishes to work on.

BRIEF DESCRIPTION OF THE DRAWINGS

Embodiments of the present invention will now be described by way of examples only and with reference to the accompanying drawings, in which:

FIG. 11 is a plan view of one of the tray supports of the enclosure of FIG. 9;

FIG. 12 is a longitudinal section through the tray support;

FIG. 13 is a front elevation of a shroud for the tray support;

DESCRIPTION OF THE PREFERRED EMBODIMENTS

Figure 1:
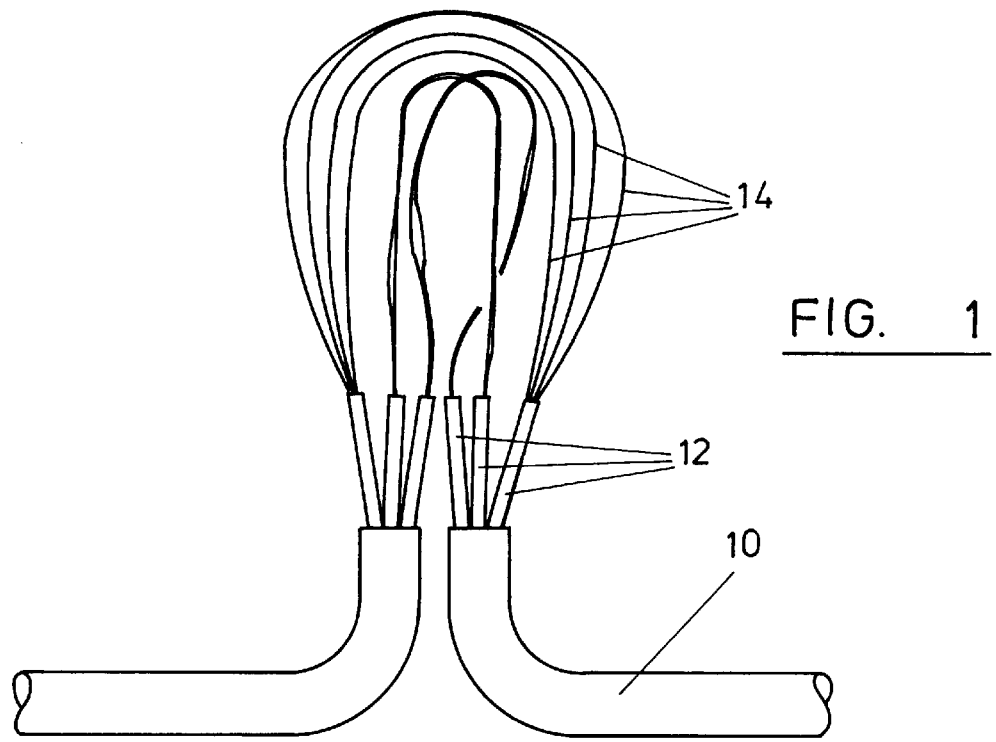
FIG. 1 is a simplified view of a bight formed in a main distribution cable at a selected point along the latter, showing the sheath and other outer layers of the cable cut away over a predetermined length, and its fibre containing tubes also cut-away but over a shorter length, to expose the individual fibres of the cable.

Referring to FIG. 1, there is shown a main optical fibre distribution cable 10 which is laid as a continuous ring, and onto which a splice enclosure of the present invention is to be installed, at a selected point around the ring, either whilst the cable is being laid or subsequently. As shown, the cable 10 is folded into a loop or bight, after its sheath and other layers have been cut away over a predetermined length of the cable, and its individual fibre-containing tubes 12 have also been cut away over a somewhat shorter length, to expose the individual fibres 14. In the example which is being described, the cable 10 comprises twelve tubes 12, each containing twelve fibres 14. However, for simplicity, FIG. 1 shows only three of the twelve tubes 12 and only a few of the twelve fibres 14 of each tube.

Figure 2:
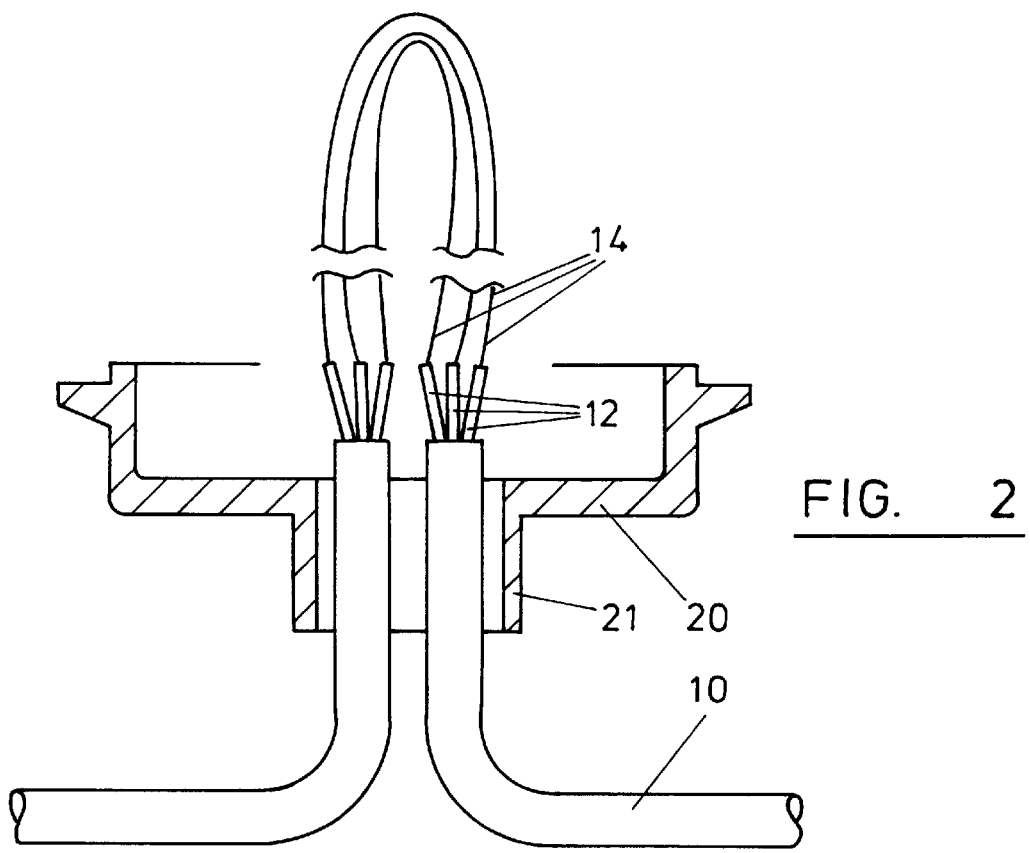
FIG. 2 is a similar view, showing the bight of the main distribution cable inserted through a base member of an enclosure in accordance with the present invention, the remainder of the enclosure being omitted from the Figure.
Figure 5:
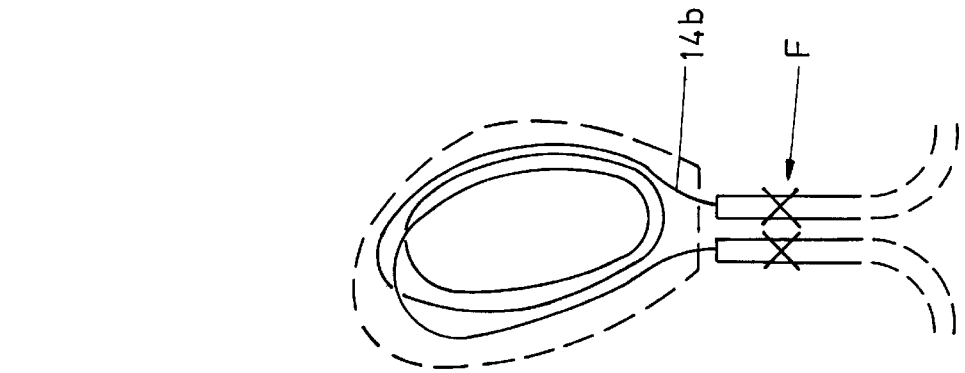
FIG. 5 shows the fibre bight folded to form a superimposed series of coils for positioning on a storage tray of the enclosure.
Figure 4:
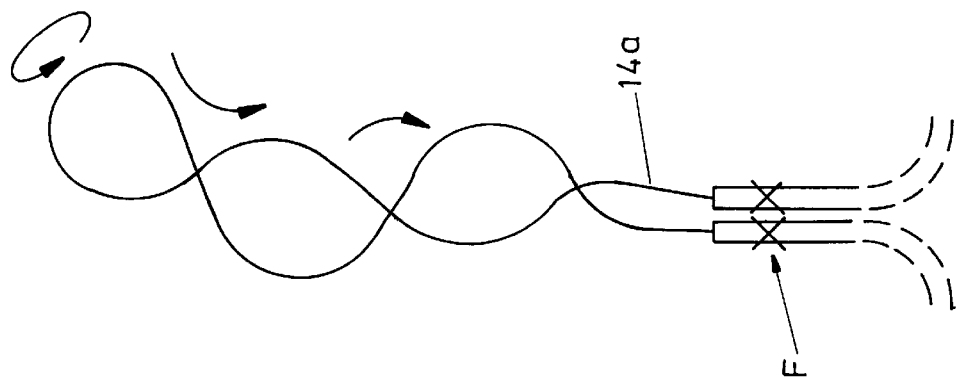
FIG. 4 shows the fibre bight, which has been separated in FIG. 3, being twisted.
Figure 3:
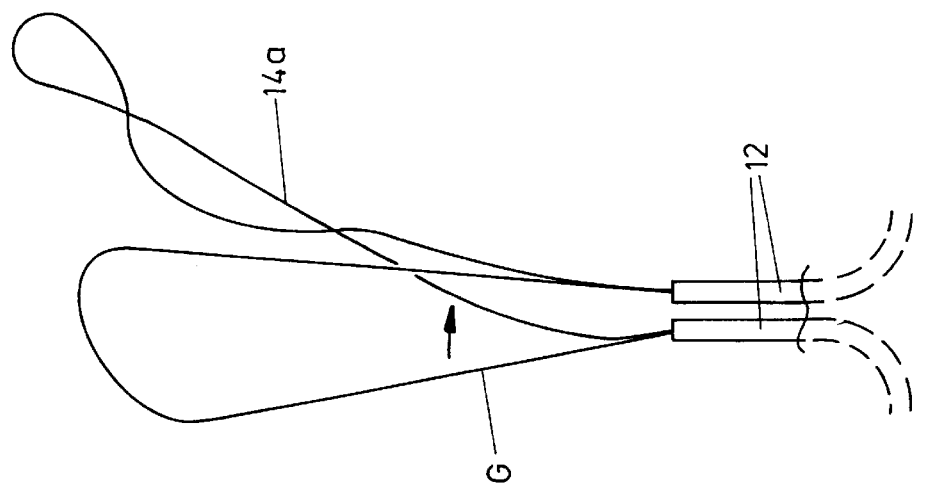
FIG. 3 shows the bight of fibres of an individual tube and showing one fibre separated from the others, ready for installation in a respective storage tray of the enclosure.

As will be described below, the bight which has thus been formed, by preparing and folding the cable 10, is inserted through a port 21 in a base 20 of the enclosure, as diagrammatically shown in FIG. 2, such that the cut ends of the sheath of the cable 10 lie to the inner side of the base 20. For simplicity, FIG. 2 omits the remaining components of the enclosure. However, the cut end portions of each individual tube 12 are engaged, side-by-side with each other, in a retention means of the enclosure, as will be described below but shown diagrammatically at F in FIGS. 4 and 5. The bights of individual fibres are then engaged with respective support trays or cassettes of the enclosure, as will also be described: in the example of enclosure shown in FIGS. 7 and 8, there are 72 trays to receive the 144 individual fibre bights, two to each tray. Each fibre bight is separated from the eleven other fibres of its group G, as shown in FIG. 3, and then is twisted e.g. twice, as shown at 14a in FIG. 4, and then folded over to form a superimposed series of coils 14b as shown in FIG. 5, which are then installed within a respective tray.

Figure 6:
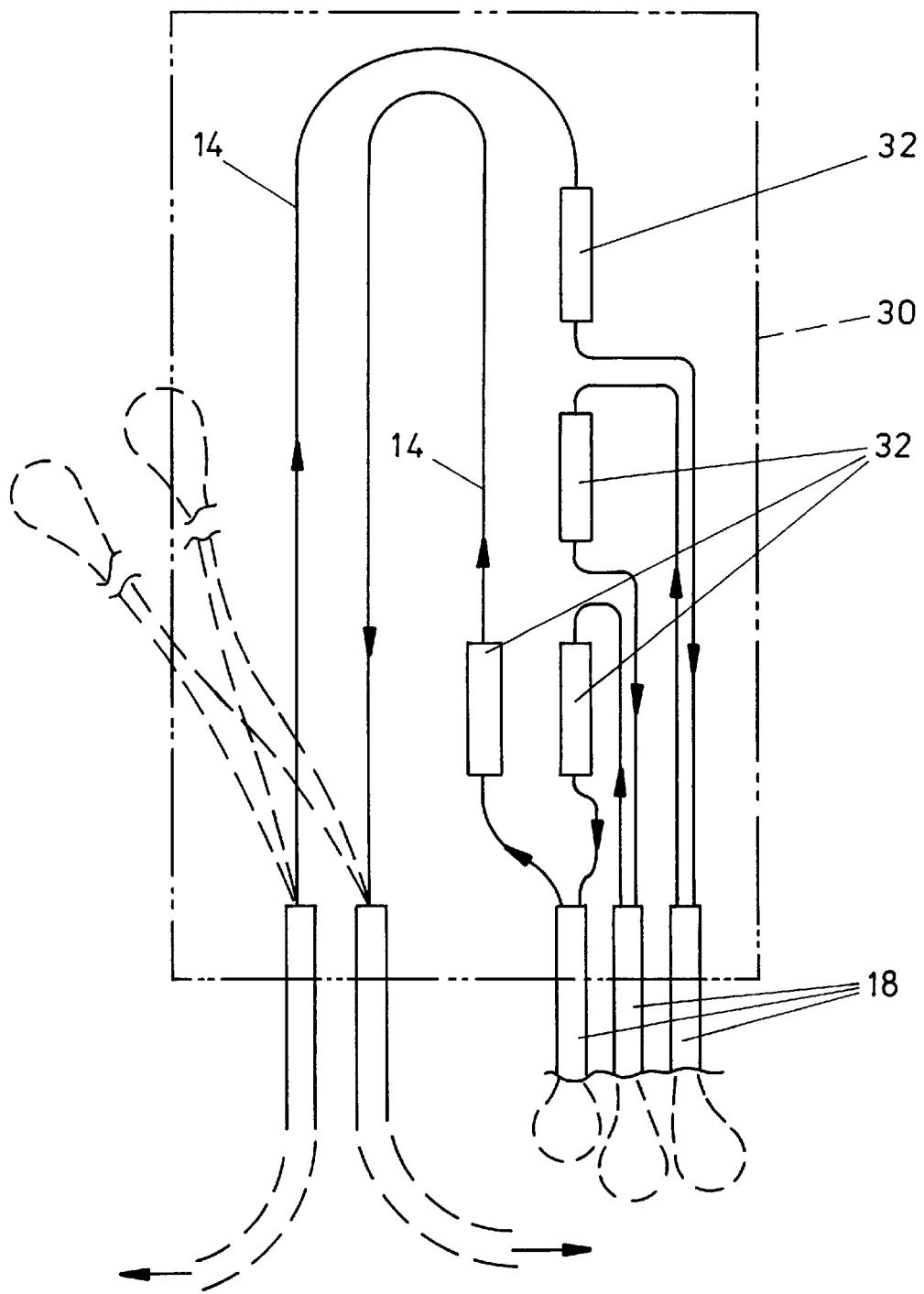
FIG. 6 is a schematic diagram to show the manner in which up to three local cables can be connected, within the enclosure, into each fibre of the main distribution cable.

As shown diagrammatically in FIG. 6, several (three in this case) local customers can be connected into each fibre 14 of the main cable 10, whilst maintaining the continuity of the ring which that fibre forms. Thus, for each customer, each fibre 14 is cut and its cut ends spliced (at 32) to respective fibres of a two-fibre cable 18 which runs from the splice enclosure to the customer, where the ends of the fibres are interconnected and a coupling is provided to the customer's equipment. The splices 32 are stored within the respective storage tray. Each tray can accommodate two fibre loops from the main cable 10 together with the splices to their corresponding local cables 18.

Figure 7:
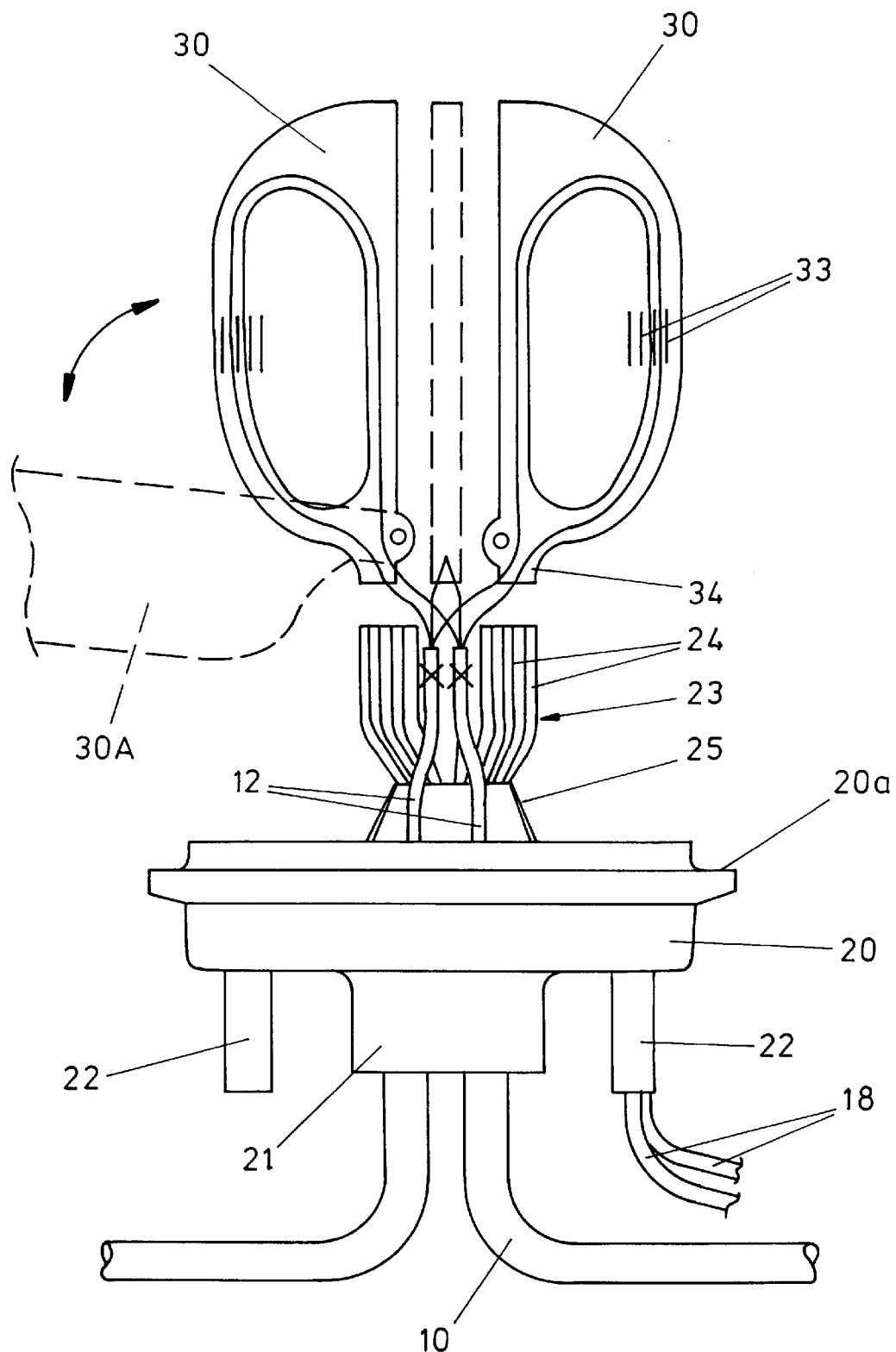
FIG. 7 is a schematic side elevation of a first embodiment of enclosure in accordance with the present invention, shown with its closure sleeve removed.
Figure 8:
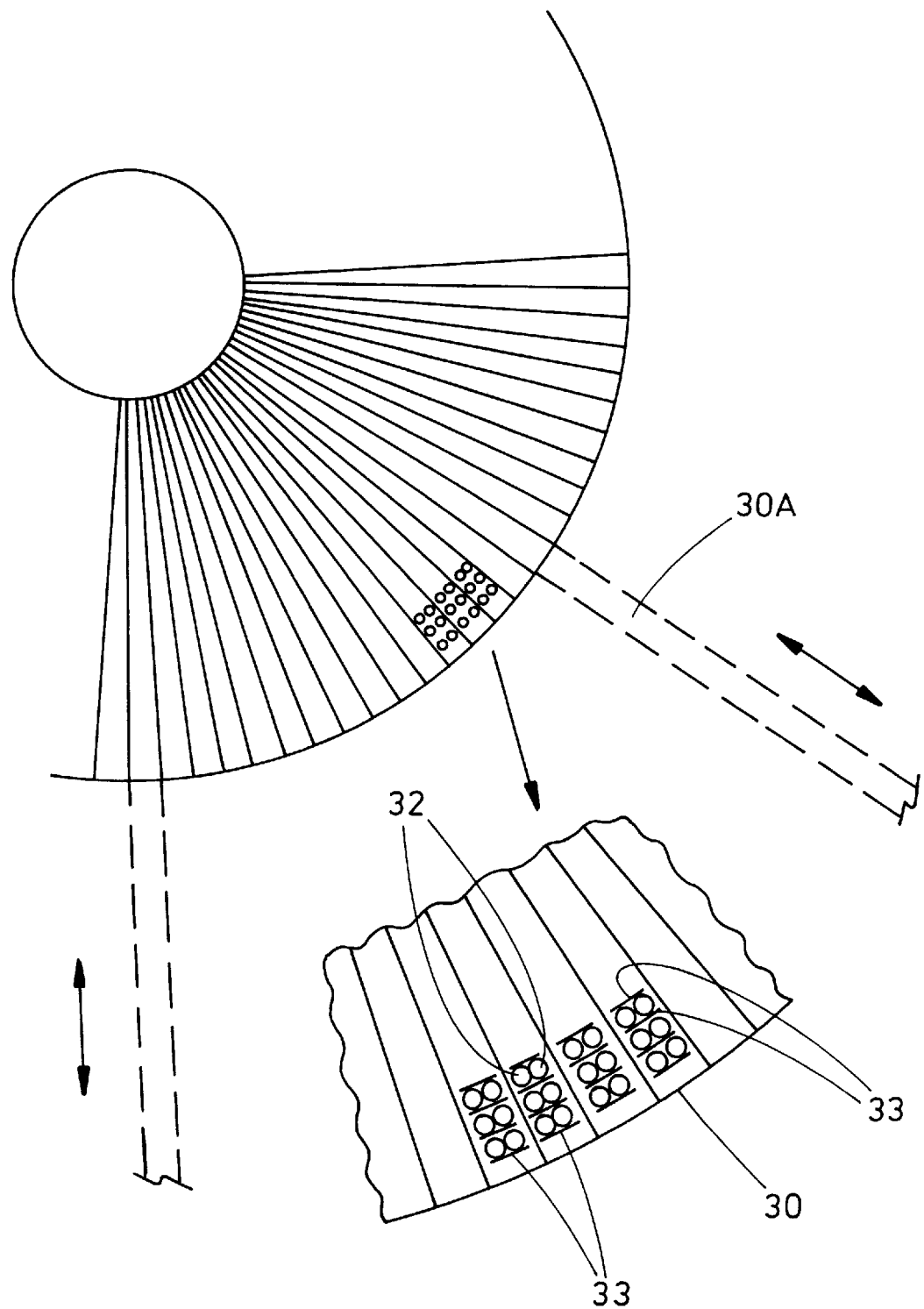
FIG. 8 is a cross-section through part of the assembly of storage trays of the enclosure of FIG. 7.

In the embodiment shown in FIGS. 7 and 8, the enclosure comprises a base member 20 having a central port 21 through which the folded-over bight of the main cable 10 can be inserted, and a plurality of ports 22 arranged around the circumference, to receive the local cables 18. Spaced from the inner side of the base 20, the enclosure includes a mount 23 having a cylindrical section which is formed with a series of grooves 24, parallel to the axis of the enclosure, to receive and retain the cut end portions of the fibre-containing tubes 12 of the main cable 10. The mount 23 is, in the example shown, supported on the base 20 by means of a plurality of struts 25 (two shown) spaced around the circumference. The storage trays 30 are mounted generally face-to-face with each other, in respective vertical planes extending radially-outwardly with respect to the axis of the enclosure. Each storage tray 30 is generally D-shaped in elevation, and is pivoted adjacent its lower end to the top of the mount 23. As shown in FIG. 8, each tray 30 tapers in thickness towards its radially inner edge, and is arranged to accommodate a number of fibre splices 32 adjacent its wider, radially outer edge. Each tray can be pivoted outwardly, as shown at 30A in FIGS. 7 and 8, to gain access for installing its fibre bights from the main cable 10, for installing the local cables 18, for splicing the cables together and for installing the splices 32 in the tray. The tray 30 comprises a flat base and a peripheral wall (which tapers in height towards the radially inner edge of the tray): adjacent its radially outer edge, the base of the tray is formed with a series of ridges 33 between which the splices 32 can be located and held. At its lower, radially inner end, each tray is formed with one or more channels 34 for receiving the fibres of the main cable 10, and for receiving the fibres of the local cables 18.

The enclosure of FIGS. 7 and 8 is completed, after installation of the cables, by a cap-ended sleeve (not shown) which is lowered over the assembly of storage trays, for its open, lower end to seat on a peripheral flange 20a of the base 20.

It will be appreciated that the enclosure which has been described is relatively compact. It will be appreciated that the procedures for installing the main distribution cable into the enclosure, and the procedures for installing local cables, are relatively straightforward and avoid the use and expense of splitters.

Figure 9:
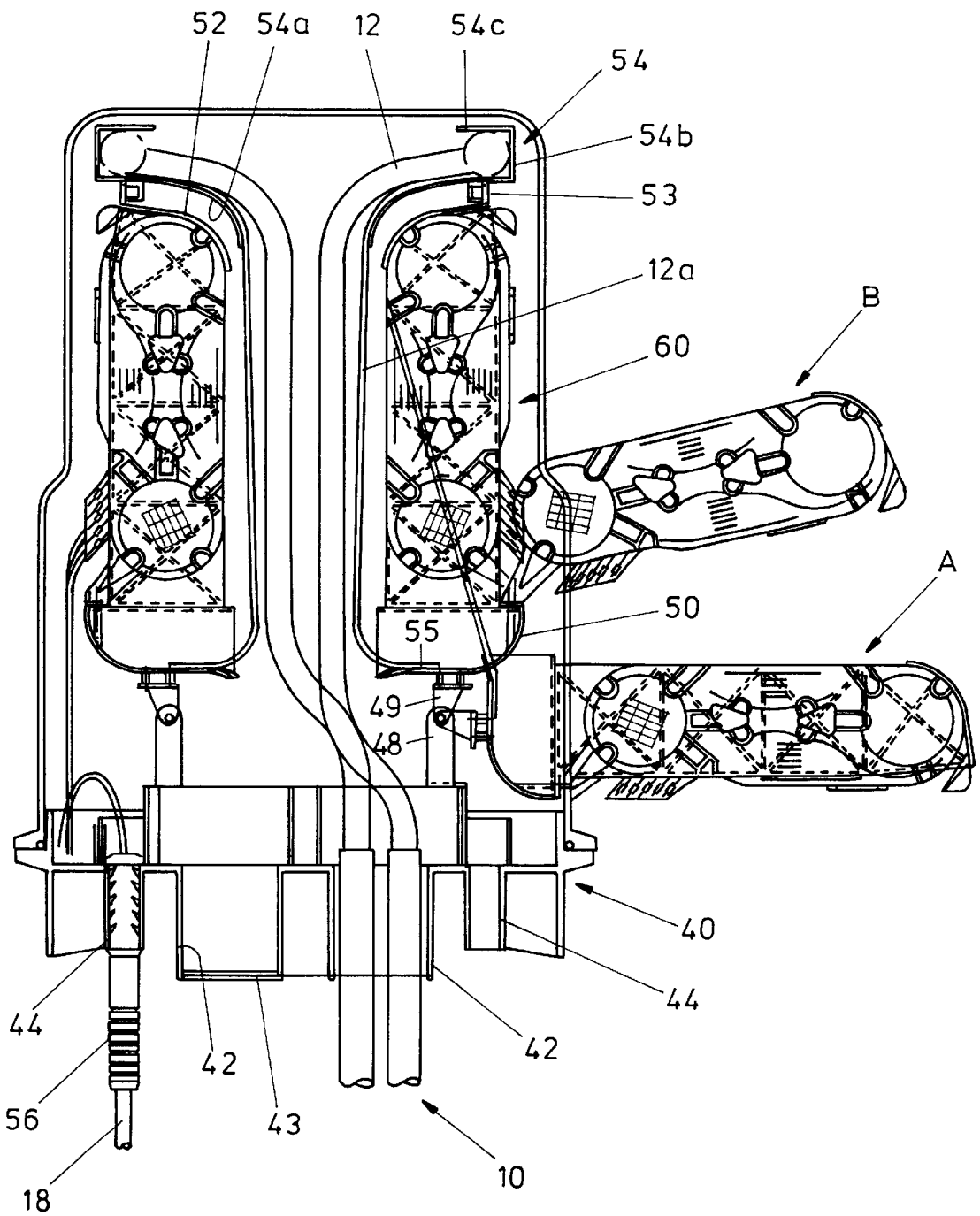
FIG. 9 is a diagrammatic longitudinal section through a second embodiment of enclosure in accordance with the present invention.
Figure 10:
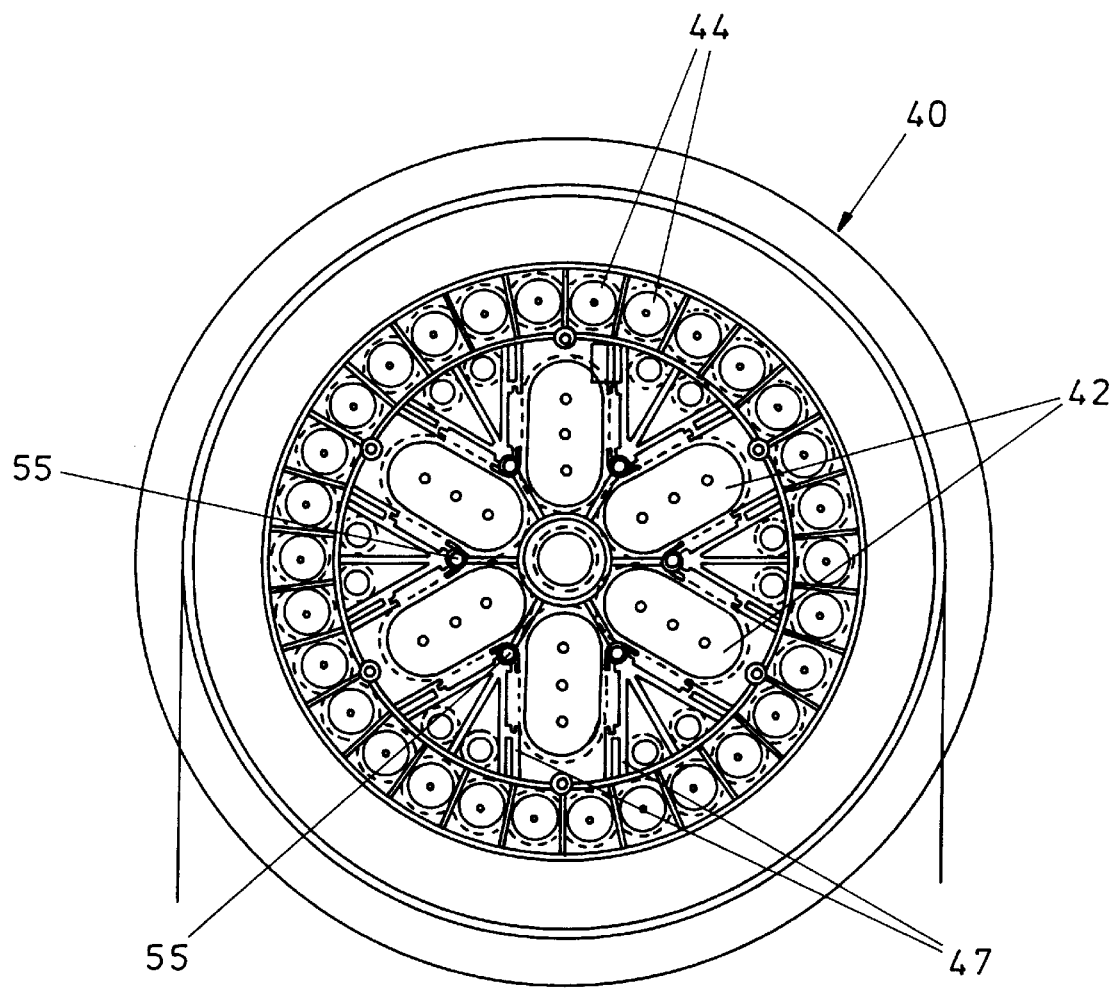
FIG. 10 is a plan view of the base member of the enclosure of FIG. 9.

A second embodiment of enclosure in accordance with the present invention will now be described with reference to FIGS. 9 to 16 of the drawings. Referring firstly to FIGS. 9 and 10, the enclosure comprises a base 40 which is formed with six main ports 42 which are oval in shape, oriented radially of the base and spaced at equal angles around the base. The base is also formed with a series of thirty smaller, secondary ports 44 which are circular in shape and arranged in a ring around the main ports 42. As manufactured, the ports 42,44 are all closed by respective membranes e.g. 43 which can be pressed-out as and when each port is required to receive a cable therethrough. As will be explained, each of the main ports 42 may receive a folded loop or bight of a cable 10, once its outer layers have been cut-back over an appropriate length of the cable, as shown in FIG. 9. As in the previous embodiment, the enclosure has a capacity for 72 trays each receiving two fibre loops from a main cable: thus, a single cable of 144 fibres may be inserted through one of the main ports 42, or several cables (each of a smaller number of fibres) may be installed through different ones of the main ports 42. The secondary ports 44 are used for the local or drop cables e.g. 18.

A particular feature of the enclosure of FIGS. 9 to 16 is that it is arranged to accommodate its 72 trays as six separate modules, each module comprising twelve trays. The modules can be added to the assembly as and when required: also, each tray is removable from its module.

Each module of trays comprises a tray support 50 of segmental shape (as best seen in FIG. 11) to which the respective set of twelve trays are pivoted, as will be described in more detail below. As shown in FIG. 9, each tray support 50 is mounted on a swivel bracket 49 having pivot studs at its opposite ends, which are engaged in respective holes at the upper ends of two upstanding arms 48 of a swivel support: the swivel support is mounted to the enclosure base by insertion of the bottom ends of its two arms 48 into a pair of sockets e.g. 47 formed in the base, either side of a respective main port 42 (FIG. 10). Thus, as shown at A in FIG. 9, each tray support 50 can be pivoted downwardly and outwardly, together with its twelve trays. A shroud 52 is mounted to the top of each tray support 50 and serves to retain the trays in position, but each tray can be pulled free from the shroud 52 and pivoted downwardly and outwardly therefrom, as shown at B in FIG. 9. Each module is normally fixed in its upright position by means of a ¼ turn screw 53 carried at the top of the shroud 52 and engaged with a depending lug on a fibre storage ring 54. The latter ring 54 has a main, funnel-shaped portion 54a, an upstanding peripheral wall portion 54b, and a number of retainer tabs 54c projecting radially inwardly, at spaced intervals, from the top of its peripheral wall portion. The main funnel-shaped portion 54a of the ring 54 is directed downwardly and has a large central opening: the ring 54 is supported in the position shown by three vertical support rods (not shown) the upper ends of which engage sockets spaced equally around the central opening in the ring 54, the lower ends of these support rods being inserted in selected ones of six sockets 55 (FIG. 10) disposed in the base between the main ports 42.

The tray support 50 of each of module is shown in more detail in FIGS. 11 and 12, and comprises a bottom wall 50a which curves forwardly and upwardly to merge with a front wall 50b: the tray support further comprises opposite end walls 50c which are formed with fixing points 50d to support the shroud 52. The underside of the bottom wall 50a has projecting studs 50e for fixing the tray support 50 to its swivel bracket 49. At its front (or radially-outer edge), the tray support 50 has twelve pairs of upwardly-extending projections 51, the upper ends of which are formed with notches 51a having semi-circular inner ends: each of the trays has a pair of oppositely-directed studs which engage within the notches 51a of a respective pair of the projections 51 of the tray support 50.

As shown in FIG. 13, the shroud 52 of each module comprises opposite side walls 52a are joined at their upper ends by an arcuate top wall 52b formed with a lug 52c for the retention screw 53. In assembly, the shroud 52 is fixed to the tray support 50 with the lower edges of its side walls 52a fixed against the upper edges of the end walls 50c of the tray support.

Figure 14:
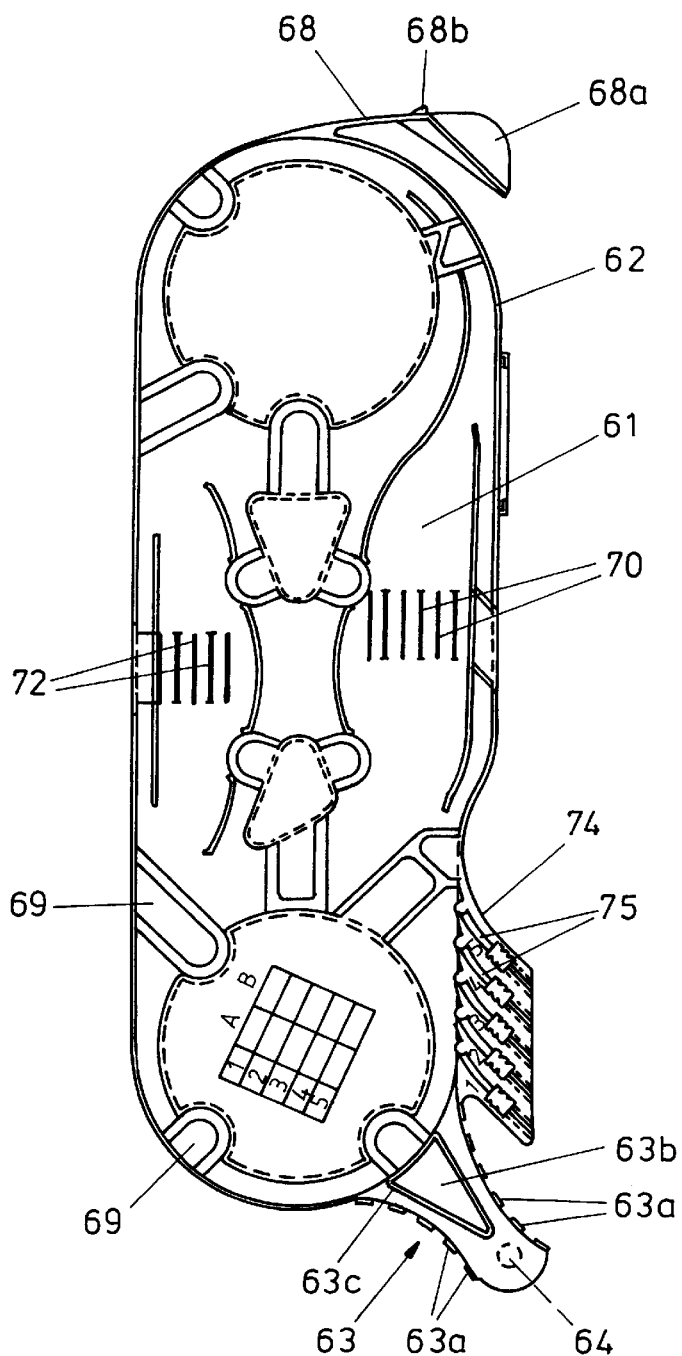
FIG. 14 is a plan view of one of the trays of the enclosure of FIG. 9.
Figure 16:
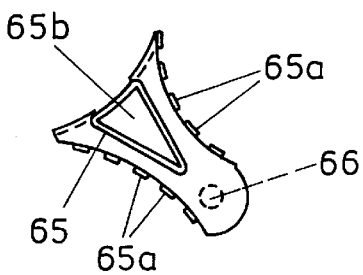
FIG. 16 is an underside view of a cover member for the entry guide to the tray.
Figure 15:
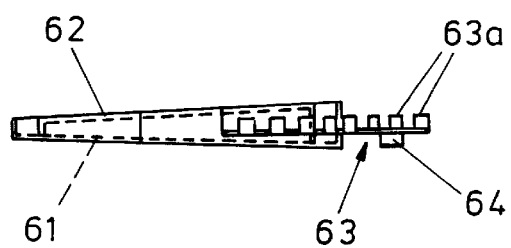
FIG. 15 is an end view of the tray.

One of the trays 60 will now be described in more detail with reference to FIGS. 14 to 16. The tray comprises a generally flat bottom wall 61 of elongated shape but with rounded upper and lower ends. A wall 62 projects upwardly from the bottom wall 61 and extends around the periphery of the tray, although with certain interruptions. As shown in FIG. 15, the peripheral wall is greater in height along one longitudinal edge of the tray than the opposite edge, and decreases progressively in height from the one longitudinal edge to the other around the curved ends of the tray. Thus the tray tapers in thickness across its width. At its lower end, adjacent its wider edge, the tray has an outwardly and downwardly projecting entry guide portion 63 formed on its outer surface with a pivot stud 64. The entry guide 63 has opposite concave-curved edges formed with upstanding teeth 63a. The entry guide 63 is also formed with an aperture 63b, tapering outwardly, having an upstanding peripheral wall 63c. The entry guide 63 forms a guideway for bare optical fibres, laid between either set of teeth 63a and the adjacent run of the wall 63c: it will be noted that the opposite edges of the entry guide 63 are curved so as to merge with the periphery of the main portion of the tray. A cover member, as shown in FIG. 16, is provided to engage over the entry guide 63 of the tray, to hold the respective fibres in place and provide the second, opposite pivot stud for the tray. Thus, the cover member comprises a flat wall 65 having opposite curved edges, complementary to those of the projection 63, formed with upstanding teeth 65a. The same side of the wall 65 has a triangular-shaped projection 65b and the opposite side of the wall 65 has the second pivot stud 66 projecting from it. It will be appreciated that the cover member of FIG. 16 is arranged to be engaged over the entry guide 63 of the tray, such that its triangular projection 65b fits within the aperture defined by the upstanding wall 63c of entry guide 63, its teeth 65a engage between respective teeth 63a of entry guide 63, and its pivot stud 66 is co-axial with, but directed oppositely to, the pivot stud 64 of the tray. In particular, because neither the triangular projection 65b nor any of the teeth 65a encroach on the areas of the entry guide 63 on which the fibres might rest, the risk is avoided that any of the fibres might be trapped and damaged upon engaging the cover member onto the entry guide 63.

It will be appreciated that once the cover member has been fitted to the tray, the tray may be pivotally mounted to the tray support, with its opposed pivot studs 64,66 engaged in an adjacent pair of the notches 51a at the front of the tray support 50.

The upper end of the tray is formed with a flexible extension 68 which projects outwardly away from the thinner edge of the tray, the extension 68 having a tab 68a at its outer end and a wedge 68b on its top. The arrangement is such that when the tray is pivoted upwardly and into its shroud 52, the extension 68 snap-engages (via its wedge 68b) with the concave under-side of the arcuate top wall 52b of the shroud, to retain the tray in that position. The tray is released, to be pivoted outwardly and downwardly, by gripping then pulling the tab 68a.

It will be noted that the bottom wall of the tray is formed with various projections to form guideways for loops of fibres laid on it. These are retained in the tray under fingers e.g. 69 projecting generally parallel to but spaced from the floor of the tray (and e.g. projecting from the top edge of the peripheral wall of the tray). The bottom of the tray is also formed, adjacent its wider edge, with a first series of ridges 70: a pair of fibre splices may be retained, one on top of the other, between each adjacent pair of these ridges. A second series of ridges 72 are formed adjacent the thinner edge of the tray, to retain a single fibre splice between each adjacent pair of such ridges.

An outlet guide portion 74 curves outwardly from the wider edge of the tray, adjacent the entry guide 63. Outlet guide 74 is formed with e.g. five grooves 75 to accommodate the fibres of local cables 18. The outer ends of these grooves are formed as sockets to receive the ends of tubes through which these fibres pass.

The manner in which the enclosure of FIGS. 9 to 16 is used will now be described. As mentioned above, and referring to FIG. 10, the outer layers of the cable 10 are cut away over a predetermined length, to expose its fibre-containing tubes (indicated as a group at 12 in FIG. 10). The loops or bights of fibre tubes 12 are inserted through the port 42 in the enclosure base, are passed up the centre of the enclosure and through the central opening of the fibre storage ring 54. The loops of fibre tubes 12, optionally folded over to form coils, are laid within the top of ring 54. The fibres may be kept in this condition until it is desired to connect local cables 18 to the main cable 10. At that time, the required number of loops of fibre tube are drawn back down the centre of the enclosure to enter a tray support 50: alternatively, the fibre tube may pass directly from the port 42 to the tray support; in either case, each fibre tube e.g. 12a is cut away over predetermined length, to bare its fibres. The fibre loops are drawn through the tray support 50 and over its front edge (once its trays have been pivoted outwardly or removed). Each tray will accommodate two fibre loops: the fibres of those loops are positioned between a pair of the upstanding pivot projections 51 of the tray support 50, then on the entry guide 63 of the tray, and stored in appropriate configuration within the tray. The entry guide 63 is closed by its cover member, and the tray can then be pivoted on the tray support 50, on the same pair of pivot projections 51 between which the fibres of its respective loops have been inserted.

Referring again to FIG. 10, the ends of the fibre tubes are held to the bottom wall of the tray support 50 by a clamp 55 having studs which engage in apertures 55a in the bottom wall of the tray support (FIG. 11). A cover (not shown) is also fitted over the bottom of the tray support 50, to cover the bare fibres.

Local cables e.g. 18 are passed into the base of the enclosure through the ports 44: a sealing and locking sleeve 56 e.g. as described in our U.K. patent application Ser. No. 2,277,206, is used to hold the cable 18 in position and seal the port. The fibres of this cable are contained within tubes which are inserted into respective channels of the outlet guide 73 and the respective fibres run through these channels into the tray, where they are spliced to fibres of the main cable 10.

Figure 17:
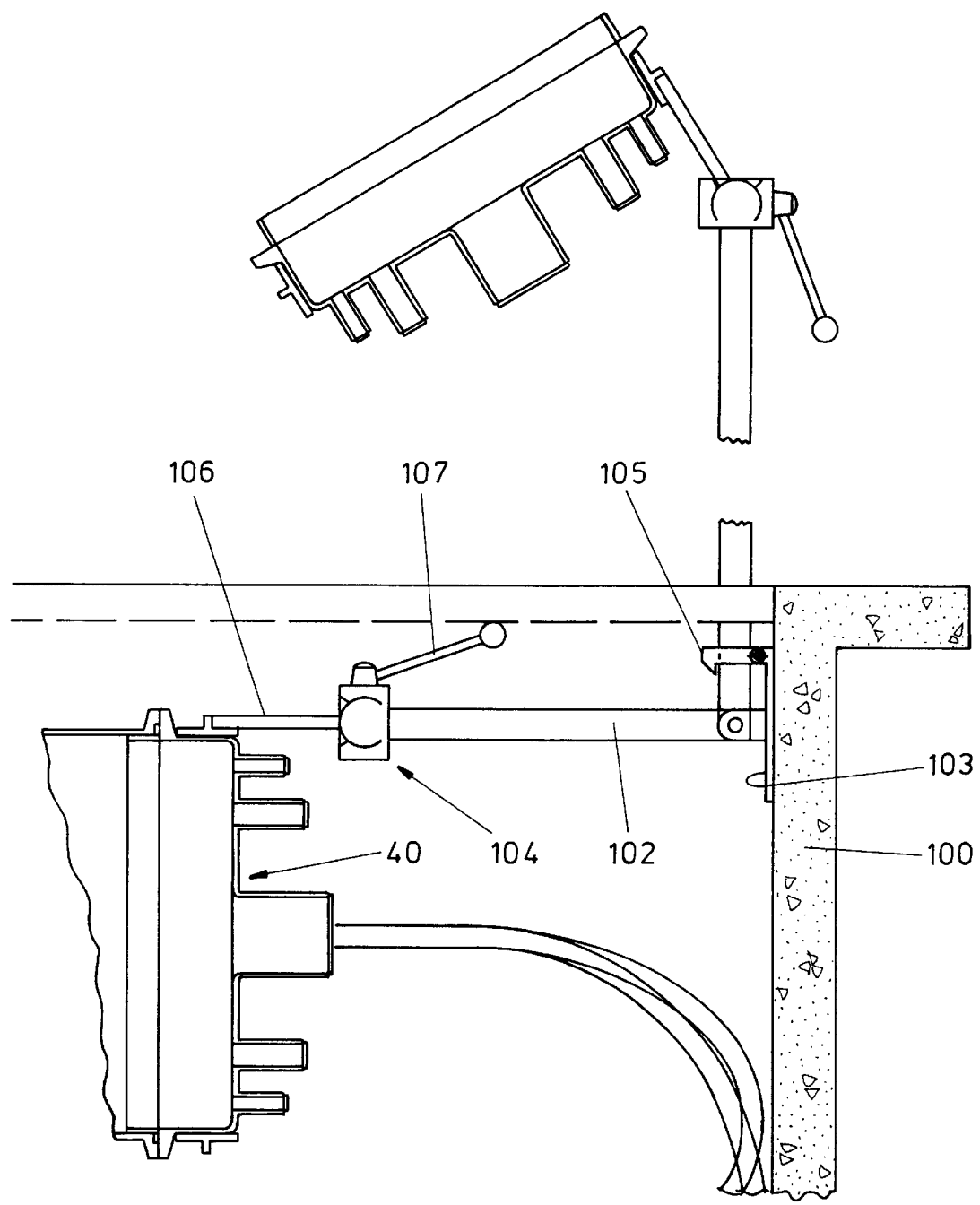
FIG. 17 is a schematic view of a mounting arrangement for mounting a splice enclosure within a pit.

Referring to FIG. 17, the enclosure which has been described may be mounted in a generally horizontal position within a pit provided with a box 100 laid in the ground. The compact nature of the enclosure enables it to be accommodated in a box of relatively small size, e.g. 1 meter long, 600 mm wide and 600 mm deep. A mounting arm 102 is pivoted at one end to a bracket 103 fixed to the wall of box 100, adjacent its top edge: preferably arm 102 is telescopic. At its outer end, arm 102 is joined by a swivel joint 104 to a second arm 106, which is rigidly mounted to the base 40 of the enclosure at its periphery. When access to the enclosure is required, arm 102 is pivoted from its normal, horizontal position to an upright position, in which it is retained by a catch 105: the enclosure can then be raised, extending the telescopic arm 102; a clamp (not shown) is provided to secure the telescopic arm in its extended condition. Further, a clamp 107 of the swivel joint 104 can be released to enable the enclosure then to be tilted in any desired direction. Thus, if the operator tilts the enclosure away from him, then pivots outwardly a tray on the right hand side of the enclosure (once the closure sleeve has been removed), then that tray will lie more or less flat in front of him to provide ready access to the tray and its contents for him to work on it.

What is claimed is:

1. A splice enclosure for optical fibre cables, comprising a plurality of trays to receive coils of optical fibres and/or fibre splices, splitters or other components, said trays being arranged generally face-to-face with each other in radial planes, around a longitudinal axis of the enclosure, each said tray tapering in thickness towards the longitudinal axis of said enclosure.

2. A splice enclosure as claimed in claim 1, wherein said trays are arranged as a plurality of modules, each comprising a plurality of said trays.

3. A splice enclosure as claimed in claim 2, wherein each of said modules comprises a support member to which each of its trays are individually pivoted.

4. A splice enclosure as claimed in claim 3, wherein each said support member is pivotally mounted to a base member of said enclosure, so that each said module of trays can be pivoted outwardly as a group.

5. A splice enclosure as claimed in claim 1, formed with an open space in the centre of the assembly of trays, and extending axially from a base member of the enclosure.

6. A splice enclosure as claimed in claim 1, comprising a support arrangement, above the assembly of trays, to support one or more loops of a cable entering the enclosure through a base member thereof.

7. A splice enclosure as claimed in claim 6, wherein said support arrangement comprises a funnel-shaped ring having an opening in its centre.

8. A splice enclosure for optical fibre cables, comprising a plurality of trays to receive coils of optical fibres and/or fibre splices, splitters or other components, said trays being normally arranged generally face-to-face with each other in radial planes, around a longitudinal axis of the enclosure, each said tray being pivotable radially outwardly through its own plane from said normal position.

9. A splice enclosure as claimed in claim 8, comprising means for retaining said trays in their normal position.

10. A splice enclosure as claimed in claim 8, wherein said trays are arranged as a plurality of modules, each comprising a plurality of said trays.

11. A splice enclosure as claimed in claim 10, wherein each of said modules comprises a support member to which each of its trays are individually pivoted.

12. A splice enclosure as claimed in claim 11, wherein each said support member is pivotally mounted to a base member of said enclosure, so that each said module of trays can be pivoted outwardly as a group.

13. A splice enclosure as claimed in claim 8, formed with an open space in the centre of the assembly of trays, and extending axially from a base member of the enclosure.

14. A splice enclosure as claimed in claim 8, comprising a support arrangement, above the assembly of trays, to support one or more loops of a cable entering the enclosure through a base member thereof.

15. A splice enclosure as claimed in claim 14, wherein said support arrangement comprises a funnel-shaped ring having an opening in its centre.

* * * * *